United States Patent [19]

Ottó et al.

[11] Patent Number: 4,746,851
[45] Date of Patent: May 24, 1988

[54] CHARGING SET FOR THE REGENERATIVE RECHARGING OF DRY BATTERIES

[76] Inventors: Mallász Ottó, Visegrádi u. 33/b, 1132 Budapest; Tibor Mallász, Majakovszkij u. 56, 1068 Budapest, both of Hungary

[21] Appl. No.: 854,848

[22] Filed: Apr. 22, 1986

[51] Int. Cl.[4] ............... H02J 7/00; H01M 10/46
[52] U.S. Cl. ............................................ 320/2; 320/54
[58] Field of Search .............................. 320/2–5, 320/54

[56] References Cited

U.S. PATENT DOCUMENTS

| 2,451,726 | 10/1948 | Fry | 320/4 |
| 3,120,632 | 2/1964 | Hopt et al. | 320/2 |

FOREIGN PATENT DOCUMENTS

| 1198881 | 8/1965 | Fed. Rep. of Germany | 320/2 |
| 0001340 | of 1985 | Japan | 320/2 |
| 8400065 | 8/1985 | Netherlands | 320/2 |

Primary Examiner—R. J. Hickey
Attorney, Agent, or Firm—Schweitzer & Cornman

[57] ABSTRACT

In an improved charging set for the regenerative recharging of dry batteries that consists principally of a hollow insulating case (1) provided with an inner hole (13) for removably receiving standardized types of dry batteries, with mains contact pins (21, 22) for applying the charger set to nearly all standardized types of mains sockets, and of a charger rectifier circuitry, the improvement according to the invention is characterized in the charging rectifier comprising passive electric circuit elements only and no charger transformer, and simultaneously, the casing (1) being designed and shaped so as to be absolutely shock-proof by excluding access to any naked area of the inserted dry battery and all naked live contactors (30) and component parts of the charging rectifier while the mains contact pins (21, 22) and thus, the charging set are being applied to the mains for normal operation.

6 Claims, 3 Drawing Sheets

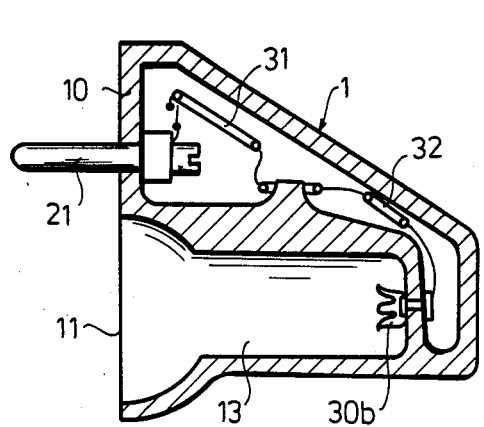
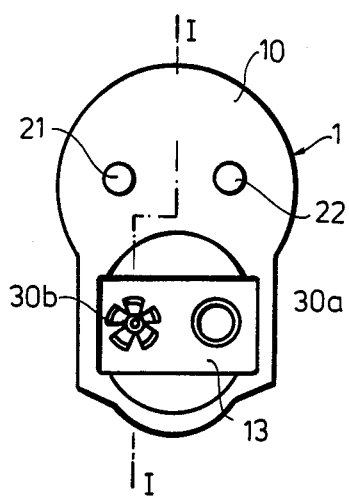
Fig. 1　　　　　Fig. 2
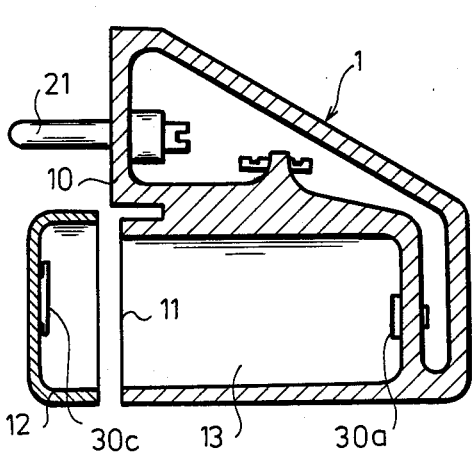
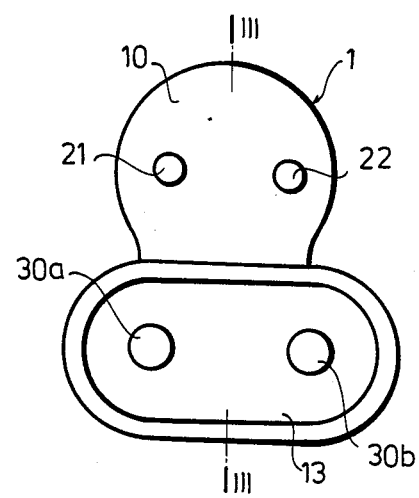
Fig. 3　　　　　Fig. 4

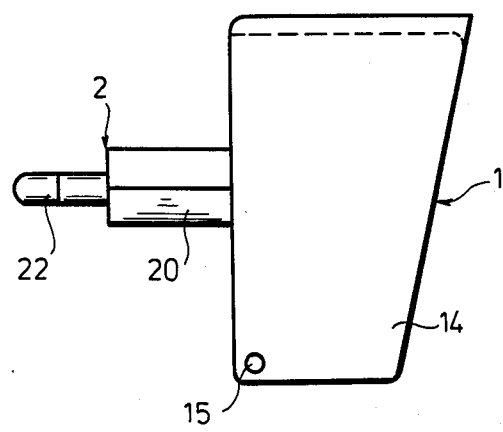
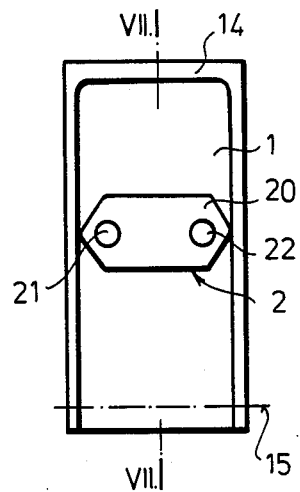
Fig. 5  Fig. 6
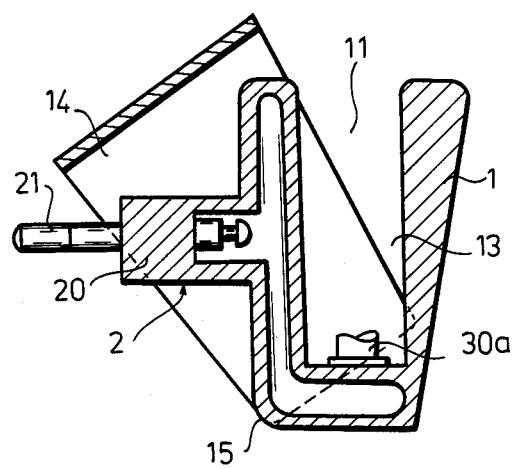
Fig. 7

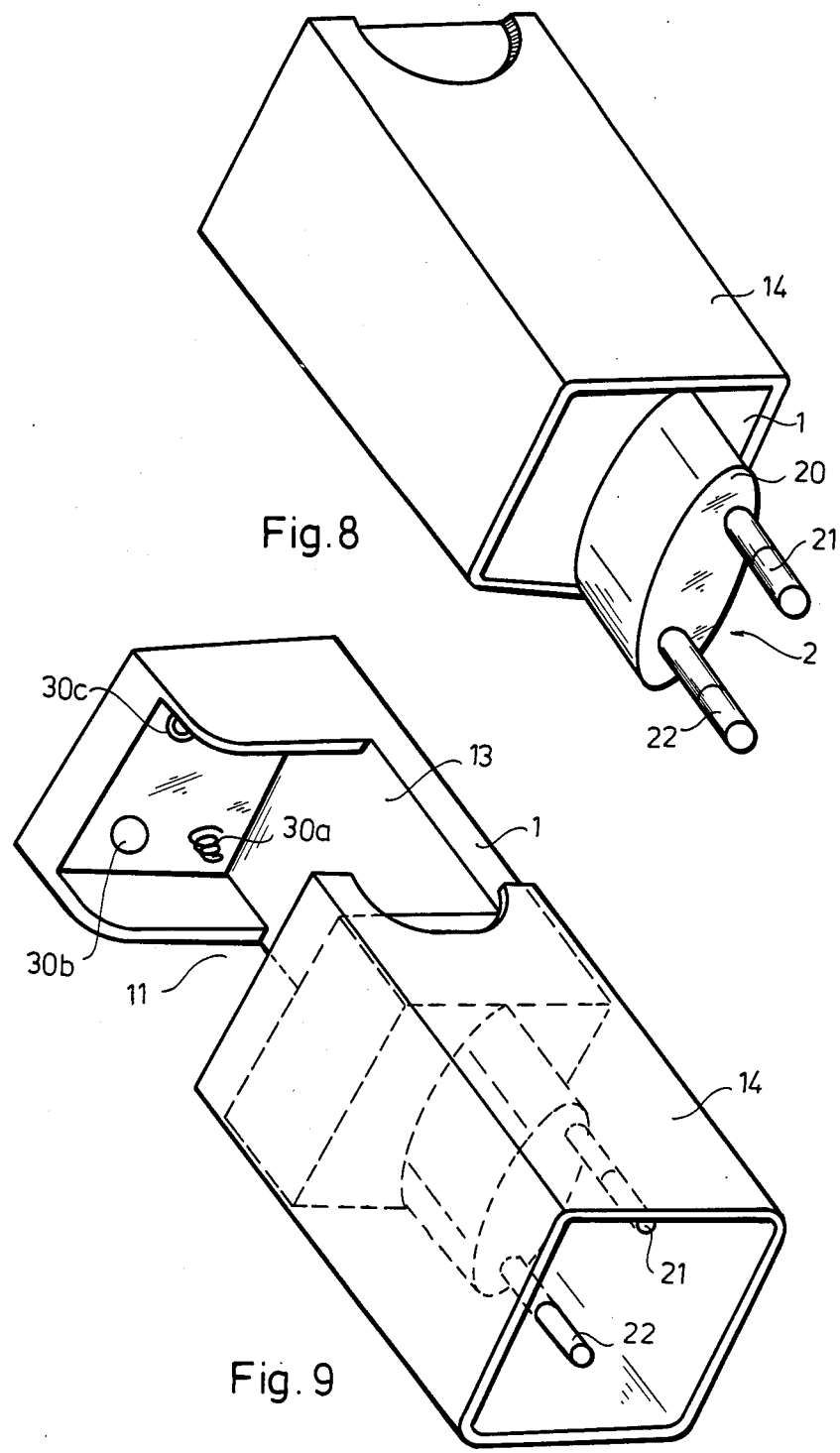

CHARGING SET FOR THE REGENERATIVE RECHARGING OF DRY BATTERIES

FIELD OF THE INVENTION

The invention relates in general to charging systems and, more particularly to an improved apparatus or charging set for the regenerative recharging of dry batteries. The charging set consists of a hollow casing made of any suitable insulating material and has a pair of mains contact pins held in pre-determined standard spaced relationship by a pin plug that is substantially integral with the casing. The pin plug is preferably of the kind applicable to any type of standardized mains sockets, thus also to grounded or earthed sockets by being provided with an insulated distance shaft of suitable cross-sectional shape and protruding length. The casing comprises an aperture or inner hole laid out in size and shape for removably receiving at least one dry battery of normal, standardized type for the purpose of recharging. The casing also comprises, adjusted to the inner hole, at least partially spring-biased or spring-like bare or naked electric contactors in an arrangement matching that of the pole terminals of the particular type(s) of dry batteries for which the set is laid out.

The charging set also includes a built-in charging rectifier consisting of current-limiting and rectifying circuit elements that are connected in series with the mains contact pins and the naked connectors to which the dry battery to be recharged is electrically connected upon its insertion into the suitably shaped inner hole.

BACKGROUND OF THE INVENTION

The general view commonly accepted so far even by those duly skilled in the art that regular dry batteries are not rechargeable. This view however, had substantially been valid until relatively small transistorized, or rather semiconductorized and battery-operated radio and other sets of very low power consumption in the range of only 10 to 25 mA appeared on the market. The above mentioned view of dry batteries being not rechargeable is still valid for batteries that are in use mainly for lighting purposes in electric appliances the current consumption of which generally lies between 0.1 to 0.3 A for normal operation.

For the purpose of recharging mainly nickel-cadmium (NiCad) accumulators and similar per se rechargeable batteries a large number of charging devices have become known and also available on the market. Such known devices are however, relatively costly and the same applies to the rechargeable accumulators as well. Besides this, the available chargers are not suitable for the regenerative recharging of regular dry batteries since they may cause serious damage to them, and using the known charger for this purpose may occasionally lead to an explosion of some of the batteries that had been inserted for recharging. Hence, the known devices of the kind referred to above, generally bear a warning notice included in their operating instruction indicating the above risk expressively.

Today, some of the leading manufacturers sell their more valuable miniaturized radio and other sets of both mains and battery operation designed and constructed for more sophisticated consumers with built-in circuitry for the regenerative recharging of the dry batteries inserted. Such built-in AC adaptors are constructed and operate as charger transformers. Hence, their cost of manufacture is substantially high and such devices as independent, purposeful sets have hitherto not become known and available to public.

Thus, the main object of the present invention is to provide a novel, improved charging set designed and constructed primarily for the purpose of the regenerative recharging of dry batteries commonly in use that is easy and very cheap with respect to its cost of manufacture especially when produced in large quantities whereby its selling price can be kept at a substantially low level.

Another equally important object of the present invention is to provide a charging set for regular dry batteries that is extremely easy to handle and is despite of its simple design and construction absolutely shock-proof under operational conditions.

The basic idea of the present invention is that for the purpose as set forth above, a charging set without a costly transformer unit, i.e. by using a charging rectifier that includes only cheap passive current-limiting and rectifying circuit elements can be developed only when substantial protection through preventing the user from access to any naked and possibly live component part of the charging set during its handling and operation is provided for. To achieve the desired objects it is essential to fulfill the above pre-conditions at the same time. Although the charging rate is limited, depending on the particular type and number of dry batteries to be recharged simultaneously, to rates between 1 to 7 mAs that can be regarded as absolutely not dangerous to the human organism, the metallic body or a run-down exhausted or fault dry battery may show, when connected in series, a live voltage of 110 to 150 V against the earth when being inserted in a plugged-in charging set having no charger transformer. Hence, for the sake of sufficient prevention of accidents any possibility of touching such areas of the inserted battery and also of any naked live component part of the built-in charging rectifier must be ultimately excluded in the plugged-in operational state of the charger set.

SUMMARY OF THE INVENTION

The objects set forth above have been achieved by the provision of an improved novel charging set for the regenerative recharging of dry batteries which consists of a hollow casing made of any suitable insulating material and has a pair of mains contact pins that are held in the pre-determined standard spaced relationship by a pin plug. The pin plug may preferably be of the kind applicable to any type of standardized mains sockets and thus, also to earthed sockets by being provided with an insulated distance shaft of suitable cross-sectional shape and protruding length. The casing comprises an aperture or inner hole configured or laid out in size and shape for removably receiving at least one dry battery or normal regular, standardized type for the purpose of recharging. The casing also comprises, affixed to the inner hole in an arrangement matching that of the pole terminals of the particular type(s) of dry batteries for which the recharger set is laid out, at least partially spring-biassed or spring-like naked electric contactors. The charging set further includes a charging rectifier means comprising current-limiting and rectifying circuit elements that are connected, between the mains contact pins, in series with the naked connectors which the dry battery to be recharged is electrically connected to upon its insertion in the inner hole of the casing. According to the present invention the charging rectifier comprises at least one current-limiting resistance and at least one rectifying diode only that are connected between the mains contact pins in series with the naked contactors matching and electrically contactable with the pole terminals of the at least one dry battery to be recharged. In combination with the above, the casing of the recharger set according to the invention is designed area shaped so as to be absolutely shock-proof by excluding access to any naked are of the inserted dry battery (or batteries) and all naked live contactors and component parts of the charging rectifier while the mains contact pins and thus, the charging set are being applied to the mains for normal operation.

Improved prevention of accidents is achieved with an improved embodiment of the charging set in accordance with the present invention wherein the current-limiting resistance in the charging rectifier is subdivided into at least two resistors. Each of these approximately half-value resistors is directly connected to one of the mains contact pins, respectively.

Alternatively, but also simultaneously the charging rectifier means may also include a circuit breaker switch comprising a pair of normally-open contacts that are engageable into their electrically closed position by means of a protruding mechanical actuator by fully applying the mains contact pins and thus the charging set to the mains only. Each of said normally-open contacts of the circuit breaker switch should preferably be directly connected to one of the mains contact pins, respectively.

In one preferred embodiment of the charging set according to the invention the mains contact pins of the pin plug protrude from one substantially planar wall face of an enclosed casing. The inner hole is provided with a free access opening for easy battery insertion (and removal after recharging). This free access opening is however, in accordance with the broad sense of the invention, arranged within one and the same substantially planar wall face of the casing the mains contact pins protrude from. Thus, when the charging set is plugged in, no access to possibly naked live metallic component parts of the set and the inserted battery is allowed by this very purposeful design.

In a slight modification of the preferred embodiment described above the free access opening of the inner hole may be provided with a removably fitted closure member, preferably with a lid. The lid may carry at least one of the contacts that are suitable for electrically contacting at least one of the pole terminals of the dry battery inserted in the inner hole for recharging. This embodiment is particularly suitable when the charging set is laid out for the recharging dry batteries of cylindrical shape the pole terminals of which are generally arranged at their opposite bottom surfaces, respectively.

In another basic group of preferred embodiments of the charging set according to the present invention the casing may well be provided with a cover member that is movable in both directions between an open first position and a closed second position. In line with one of the combinative main characteristic features of the present invention the cover member is designed and shaped so as to allow the mains contact pins of the pin plug to be applied into any mains socket in its entirely closed second position only. With the cover member staying in its open first position however, free access to the inner hole of the casing for easy insertion of the battery (or batteries) to be charged or for any equally easy removal of the regenerated, recharged battery (or batteries) is maintained. Said cover member may either be tiltable between its first and second positions or alternatively, it may also be slidably guided for moving it linearly along the casing between said positions.

The charging set according to the present invention may be provided with a casing that is laid out so as to be suitable for the regenerative recharging of e.g. one 9 V dry battery, or one 4.5 V flat battery, or even for the simultaneous regenerative treatment of 2 to 4 pieces of cylindrical dry batteries of the types R6, R12, R14 or R20. Depending on the particular type of battery the regenerative recharging is performed by applying a rate of charge that may within the range from 1 to 7 mAs D.C. Such charging current can be provided e.g.. by connecting two ohmic resistances of an ohmage between 5–40 kOhms (0.25 to 0.5 W) each, together with 1 to 4 pieces of preferably point-contact diodes in series. Practical experiments have shown that by applying the above data, dry batteries for the purpose of their use for transistorized pocket radios of a power consumption between 10 to 20 mAs can be economically recharged five to eight times in sequence. The prolongated operational lifetime of such recharged batteries will show however, a decreasing tendency with the growing number of treatments. On the first occasion after having been regenerative recharged over a charging period of 8 to 10 hours, a regular dry battery is capable of supplying a power current between 10 and 20 mAs over a working period of about 6 hours. Following the sixth to eighth regenerative recharging the prolongated working period of such recharged dry batteries may still range from 1 to 3 hours. Success and efficiency of the regenerative recharging depend however, largely on the condition and the individual characteristics of the particular piece of battery to be recharged. Very old run-down and long stored dry batteries can no more be recharged successfully. Experience has shown that the nominal working lifetime of around 20 hours (measured by discharging across a resistance of 900 Ohms) of a regular, normal 9 V dry battery of average condition can be increased up to two to three times of said nominal value by proper regenerative recharging. The above result can be acheived with little input as to both work and power.

A main advantage of the improved charging set provided by the present invention lies in its being absolutely shock-proof while it shows at the same time all desired favourable features as to cost to manufacture and other indicators of economy. Even in a rare case of a breakage or other damage, no higher current than 3 to 5 mAs will flow through the human body when getting in touch with a possibly live metallic body are of a dry battery inserted for the purpose of regenerative recharging in a broken set.

Besides using it for the purpose of the recharging of exhausted dry batteries, the charging set according to the present invention may also be successfully applied for the known normal recharging of run-down nickel-cadmium (NiCad) and other known types of accumulators.

BRIEF DESCRIPTION OF THE DRAWINGS

The invention will be more detailed and more particularly described by introducing, by way of example only, preferred embodiments of the improved charging set according to the present invention. For the sake of better understanding, reference is made to the attached drawings in which FIG. 1 shows a simplified cross-sectional view of a first embodiment of the improved charging set according to the invention taken along the line I—I indicated in FIG. 2, FIG. 2 shows a simple front view of the charging set according to FIG. 1, FIG. 3 shows a cross-sectional view taken along a plane indicated by the line III—III in FIG. 4 of a second preferred embodiment of a charging set in accordance with the present invention, FIG. 4 shows again, a simplified front view of the charging set indicated in FIG. 3, FIG. 5 shows a side elevational view of a third preferred embodiment of the charging set according to the invention, FIG. 6 shows a front view of the charging set as per FIG. 5, FIG. 7 shows a cross-sectional plan view of the charging set as per FIGS. 5 and 6 that is taken along a plane indicated by the line VII—VII in FIG. 6, FIG. 8 shows a first perspectic view of a fourth preferred embodiment of the charging set according to the present invention, the charging set being shown in its state ready for operation, and FIG. 9 shows a second perspectic view of the same charging set as indicated in FIG. 8. Here the charging set is shown in a state where the inner hole of the casing is free accessible for easy battery insertion.

DESCRIPTION OF PREFERRED EMBODIMENTS OF THE INVENTION

In a preferred first embodiment of the improved charging set according to the present invention as shown, by way of example only, in FIGS. 1 and 2 a casing 1 made of insulating material, preferably of a thermoplastic material by press-moulding includes an inner hole 13 that is accessible through a free access opening 11 for the easy insertion (and removal) of, for example, one 9 V dry battery of the type 6F22 for the purpose of its regenerative recharging. In a bottom wall of the inner hole 13 suitably shaped naked electric contactors 30a and 30b are arranged in a manner so as to match the pole terminals of the battery (not shown) to be recharged. The charging set is applicable to the mains via mains contact pins 21, 22 that are easily insertable in a normal standardized mains socket. Within the casing 1 a very simple circuitry of a charging rectifier circuit means consisting of two ohmic resistances 33 each of them being directly connected to one of the mains contact pins 21, 22 respectively, and two diodes 32 connected in series with the resistances 31 respectively, is arranged. In the cross-sectional view shown in FIG. 1 it is clearly indicated that the mains contact pins 21, 22 protrude from a substantially planar wall face 10 of the casing 1, and within the same wall face 10 is cut out the free access opening 11 to the inner hole 13. As a result of this very simple design, a dry battery can be inserted, replaced or just removed only if the charger set is not under current, i.e. not in operation because in its plugged-in operational state the access to the inner hole 13 and thus, to any possibly live naked component part or area of both the inserted battery and the built-in charging recifier within the casing 1 is absolutely impossible by the free access opening 11 being fully covered and closed by the front face of the mains socket.

In a second possible embodiment of the improved charging set according to the present invention which is very similar to the first preferred embodiment described above, FIG. 3 and 4 show a casing 1 comprising an inner hole 13 which is suitably designed and shaped for the simultaneous removably receiving of two substantially cylindrical dry batteries of, for example, the type R14 that are widely in use in transistor radio sets and are commonly called as baby batteries. As a general remark, it should be emphasized at this stage that like reference numerals designate like or corresponding parts throughout the various views and drawings. As it is well known, with cylindrical dry batteries like those of the type R14 referred to above, the pole terminals are arranged on opposite end surfaces i.e. on the bottom and top face of the batteries concerned. So as to comply with this general arrangement, in the preferred embodiment of the improved charging set as shown in FIGS. 3 and 4 the free access opening 11 of the inner hole 13 is provided with a removably fitted lid 12 that carries the contactors 30c (and 30d not shown) for electrically contacting preferably the bottom pole terminals of the dry batteries when they are inserted for the purpose of being recharged. It seems to be rather obvious that, similarly as described above, the access to the inner hole 13 and thus, to any possibly live naked component part or surface area of both the charger unit and the batteries inserted is excluded when the set is plugged in for normal operation.

FIGS. 5 to 7 show a third preferred embodiment of the improved charging set according to the present invention which is for the sole purpose of demonstration only, designed and shaped so as to be capable of receiving a 9 V dry battery of, for example, the standardized type 6F22. Here, the casing 1 is provided with a pin plug 2 of the kind that is applicable to any type of standardized mains sockets and thus, also to earthed sockets by being provided with an insulated distance shaft or spacer 20 of suitable cross-sectional shape and protruding length. The mains contact pins 21, 22 are held in their pre-determined standard spaced relationship by the pin plug 2 that forms a substantially integral part of the casing 1. The casing 1 is provided with a cover member 14 that is tiltable between an open first position and a closed second position by being rotatably attached to the casing 1 around an axis 15 that is embedded in the casing 1. In the cross-sectional view of the charging set as shown in FIG. 7 it can be clearly seen that in the open first position of the cover member 14 the dry battery can easily be inserted into or removed from the inner hole 13 of the casing 1 through the access opening 11. With the cover member 14 staying in this first position the mains contact pins 21, 22 of the pin plug 2 cannot be applied to the mains because they are prevented from being plugged in by said cover member 14. The charging set can only be plugged in an thus, brought into operating condition if the cover member 14 is tilted into its closed second position as shown in FIG. 5 of the attached drawings. In this position however, the access to any possibly naked live metallic areas of the inserted battery and to such component parts of the charging rectifier arranged within the casing 1 is entirely excluded whereby the charging set is absolutely shock-proof in accordance with one of the most important objects and characteristic features of the present invention.

In FIGS. 8 and 9 finally, a fourth preferred embodiment of the improved charging set according to the present invention is shown. In this given embodiment the charging set is configured or laid out for the simultaneous regenerative recharging of four cylindrically shaped standardized dry batteries of, for example, the type R6. A pin plug 2 encasing the mains contact pins 21, 22 is also here provided with an insulating distance shaft 20 of appropriate cross-sectional area and protruding length so as to be applicable to most types of standardized mains sockets. The casing 1 of the charging set is provided with a cover member 14 that is slidable linearly between a closed second position (FIG. 8) and an open first position (FIG. 9). Here again, in said open first position of the cover member 14 the inner hole 13 of the casing 1 is freely accessible for inserting, removing and replacing the dry batteries (to be) recharged. Although in this open first position it is possible to get in touch with the naked metallic contactors 30a, 30b, 30c (and further ones not shown in the drawing figure), an absolute prevention from any accident is provided by the charging set being prevented from being plugged in and thus from including naked live and metallic areas by the cover member 14 staying in its first position as clearly indicated in FIG. 9. The charging set is allowed to be plugged in only if the cover member 14 is slid into its closed second position where no access to the inside of the insulating casing 1 is allowed. Thus, also the above described embodiment of the charging set according to the present invention is absolutely shockproof.

In each preferred embodiment as described above in detail, the built-in charging rectifier comprises at least one current-limiting resistance 31 and least one rectifying diode 32 that are between the mains contact pins 21, 22 in series with the naked contactors 30 matching and electrically contactable with the pole terminals of the at least one dry battery to be recharged. For the sake of improved accident prevention the charging rectifier may include a circuit breaker switch that comprises a pair of normally-open contacts that function as a circuit breaker switch that are simultaneously engageable into their electrically closed position by means of an abutting mechanical actuation or force when fully applying the mains contact pins to the mains only. Each of the normally-open contacts of the circuit breaker switch should be directly connected in series with one of the main contact pins, respectively. The above indicated circuit breaker switch will immediately disengage the charging set from the power supply when the pin plug 2 or rather its mains contact pins 21, 22 are not fully applied to the mains socket.

On the basis of the above detailed description of some preferred embodiments it will be quite obvious to those duly skilled in the art that not only the above particular embodiments but also other designs may be developed for all kinds and combinations of standardized dry batteries without departing from the broad sense of the invention.

We claim:

1. An improved charging apparatus for the regenerative recharging of dry batteries, said apparatus having a hollow casing formed of any suitable insulating material and having at least a pair of mains contact pins held in a pre-determined standard spaced relationship by a pin plug preferably being of the kind applicable to any type of standardized mains sockets by being provided with an insulated distance shaft of suitable cross-sectional shape and protruding length, said casing having an aperture conforming in size and shape for removably receiving at least one dry battery of normal, standardized type for the purpose of recharging, said casing also having contactors affixed to said casing in said aperture, said contactors formed into at least partially spring biassed or spring-like bare metallic contactors configured to match the pole terminals of the particular type(s) of dry batteries for which the casing is formed, said apparatus further having charging means connected in series between said mains contact pins and said bare metal contactors to which the dry battery to be recharged is electrically connected upon its insertion in said aperture of said casing, the improvement comprising:

the charging means comprises at least one current-limiting resistance and at least one rectifying diode that are connected in series between said mains contact pins and said bare metal contactors;

said contactors matching and electrically contactable with the pole terminals of the at least one dry battery to be recharged when a battery is inserted in said aperture;

said casing shaped to exclude access to any bare metal area of either the inserted dry battery or any live contactors or component parts of the charging means while the mains contact pins is connected to the mains and a battery is inserted in said aperture, during a normal recharging operation;

said current-limiting resistance is subdivided into at least two resistors each of which is directly connected to one of the mains contact pins;

a circuit breaker switch having at least a pair of normally-open contacts that are simultaneously engaged into their electrically closed position only by the mechanical force of fully inserting said mains contact pins into said mains socket; and each of said normally-open contacts being directly connected to one of said mains contact pins.

2. An improved charging apparatus as set forth in claim 1 wherein:

said mains contact pins of said pin plug protrude from said planar wall face of said casing;

said aperture being provided with a free access opening for battery insertion; and said access opening formed within said substantially planar wall face of said casing.

3. An improved charging apparatus as set forth in claim 2 wherein:

said free access opening of the aperture is provided with a removably fitted closure lid; and said lid carrying at least one of said contactors for electrically contacting at least one of the pole terminals of the dry battery when the battery is inserted in said aperture for recharging and said lid is fitted on said casing.

4. An improved charging apparatus as set forth in claim 3 wherein:

said casing is provided with a cover member that is movable between an open first position and a closed second position; and said cover mamber shaped to allow the mains contact pins of the pin plug to be inserted into any mains socket only when said cover member is in its entirely closed second position.

5. An improved charging apparatus as set forth in claim 4 wherein:

said cover member is tiltable between said first open position and said closed second position by being rotated around an axis; and said axis being part of or substantially immovable relative to said casing.

6. An improved charging apparatus as set forth in claim 5 wherein:

said cover member is slidable between said open first position and said closed second position; and
said casing is provided with guiding surfaces for slidably guiding said cover member between said first and second positions.

* * * * *